United States Patent
Sun et al.

(10) Patent No.: US 6,616,719 B1
(45) Date of Patent: Sep. 9, 2003

(54) AIR-LIQUID SEPARATING METHOD AND APPARATUS FOR COMPRESSED AIR

(76) Inventors: Yung Yung Sun, No. 66, Shang Tien Street, Ta-Li City, Taichung Hsien (TW); Chuan Ching Cheng, No. 28, Ning Hsia Tung 1$^{st}$ Street, Taichung (TW)

( * ) Notice: Subject to any disclaimer, the term of this patent is extended or adjusted under 35 U.S.C. 154(b) by 0 days.

(21) Appl. No.: 10/102,635

(22) Filed: Mar. 22, 2002

(51) Int. Cl.$^7$ .............................................. B01D 45/08
(52) U.S. Cl. ...................... 55/315.2; 55/331; 55/462; 55/466; 55/DIG. 17; 55/434.4; 95/262; 95/288; 96/157; 96/190; 96/205
(58) Field of Search .............................. 55/315.1, 315.2, 55/320, 331, 434.4, 462, 466, DIG. 17; 95/262, 266, 284, 288; 96/157, 188, 190, 189, 194, 197, 201, 205

(56) References Cited

U.S. PATENT DOCUMENTS 3,152,877 A * 10/1964 Kaufman ........................ 95/91

* cited by examiner

Primary Examiner—Robert A. Hopkins
(74) Attorney, Agent, or Firm—Rosenberg, Klein & Lee

(57) ABSTRACT

An air-liquid separating method and apparatus for compressed air. The high pressure air output from an air compressor is transferred through a transfer tube to pass through the cooling tube of a cooling tank. The cooling tube has a diameter larger than that of the transfer tube so that the high pressure air goes from a smaller room into a larger room and the pressure is relieved. The temperature of the high pressure air is lowered due to relief of the pressure and the pressure of the vapor is, approximately the saturated vapor pressure. The cooled high pressure air is further transferred to an air-liquid separating tank. The temperature of the air is lowered to the dew point due to further relief of pressure. At this time, the vapor contained in the high pressure air is condensed into liquid water which drops onto the bottom of the air-liquid separating tank and separates from the air.

10 Claims, 3 Drawing Sheets

AIR-LIQUID SEPARATING METHOD AND APPARATUS FOR COMPRESSED AIR

BACKGROUND OF THE INVENTION

The present invention is related to an air-liquid separating method and apparatus for compressed air. By means of this method, the power consumed during air-liquid separation procedure is reduced. In addition, the conventional air cooled drier is unnecessary so that the cost for the equipment is saved and the problem resulted from failure of the air cooled drier is avoided.

In a factory, when using pneumatic tool in operation line, generally high pressure air is filled into the pneumatic tool. In condition of high temperature, it is very easy to produce water which is entrained by the high pressure air filled into the pneumatic tool. The water tends to remain in the pneumatic tool to result in rusting of internal parts of the pneumatic tool. This will affect the quality and operation effect of the pneumatic tool.

In order to overcome the above problem, the high pressure air will first flow through an air cooled drier for removing the water entrained by the high pressure air. Then the air free from the water is injected into the pneumatic tool. Accordingly, the pneumatic tool is prevented from being damaged by the water and the using life of the pneumatic tool is prolonged.

However, the air cooled drier necessitates much power for operation so that the power consumption is great. Moreover, the air cooled drier is quite expensive so that the cost is increased.

Furthermore, in case that the air cooled drier fails, it takes much time to repair the air cooled drier and the operation procedure of the operation line will be affected.

SUMMARY OF THE INVENTION

It is therefore a primary object of the present invention to provide an air-liquid separating method and apparatus for compressed air. In this method, by means of water cooling measure and natural decrement of temperature due to relief of pressure, the high pressure air is cooled without consuming any power. Therefore, the air cooled drier in the conventional device is unnecessary so that the problem resulted from failure of the air cooled drier is avoided. The cooling tube has a diameter larger than that of the transfer tube so that the high pressure air goes from a smaller room into a larger room and the pressure is relieved. The temperature of the high pressure air is lowered due to relief of the pressure. In addition, the flowing speed of the high pressure air is slowed down to prolong the time for which the high pressure air stays in the cooling tank. Under such multifold effects, the cooling effect of the cooling tank is enhanced. When the high pressure air enters the air-liquid separating tank, the temperature of the air is approximately lowered to the dew point and a great amount of vapor contained in the high pressure air is condensed into liquid water and thus separated from the high pressure air.

The present invention can be best understood through the following description and accompanying drawings wherein:

DETAILED DESCRIPTION OF THE PREFERRED EMBODIMENTS

Figure 1:
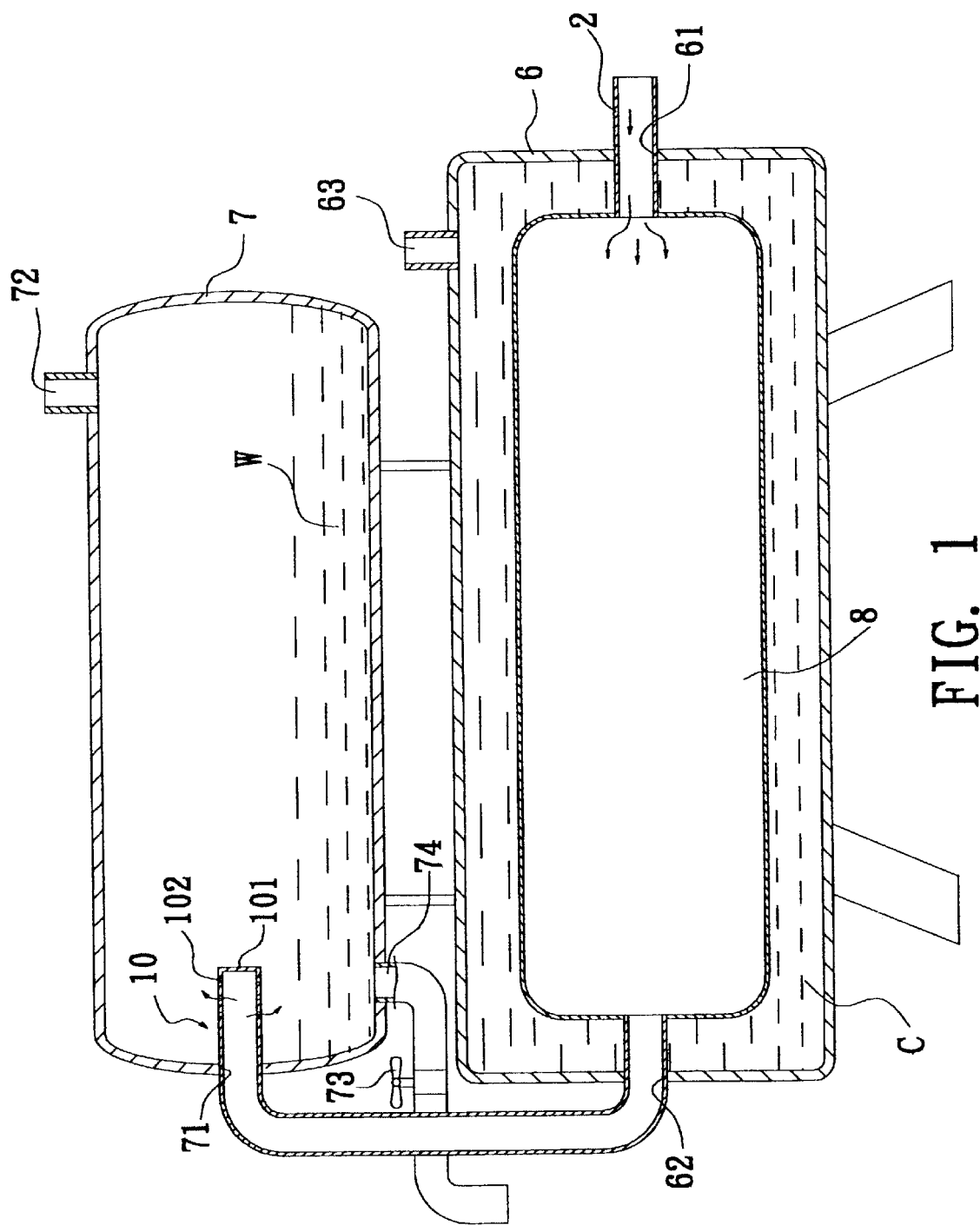
FIG. 1 is a sectional view of the present invention, showing the air-liquid separating apparatus and the air-liquid separating procedure thereof.

Please refer to FIG. 1. The air-liquid separating apparatus of the present invention includes a close cooling tank 6 and a close air-liquid separating tank 7 which are transversely arranged. The air-liquid separating tank 7 is laid on upper side of the cooling tank 6.

A water gate 63 is disposed on the top of the cooling tank 6. A coolant is filled through the water gate 63 into the cooling tank 6. In this embodiment, the coolant is water at normal temperature. Two ends of the cooling tank are respectively provided with an inlet 61 and an outlet 62. The inlet via a transfer tube 2 is connected with an air compressor (not shown). A linearly extending cooling tube 8 is connected between the inlet 61 and outlet 62. The cooling tube 8 has a diameter larger than that of the transfer tube 2.

One end of the air-liquid separating tank 7 is provided with an intake 71. The top of the air-liquid separating tank 7 is provided with an exhaust port 72. The bottom of the air-liquid separating tank 7 is provided with a water drain 74. The air-liquid separating tank 7 is equipped with a draining valve 73 corresponding to the water drain. A transfer tube 10 is connected between the intake 71 and the outlet 62 of the cooling tank. One end 101 of the transfer tube 10 inserted in the air-liquid separating tank 7 is closed. The wall of the transfer tube 10 near the end 101 is formed with multiple radial perforations 102.

When the high pressure high temperature air is output from the air compressor through the transfer tube 2 to pass through the cooling tube 8 of the cooling tank 6, the coolant C reserved in the cooling tank 6 will absorb the heat of the high pressure air to condense the water contained in the high pressure air.

Especially importantly, when going from the transfer tube 2 into the cooling tube 8 with larger diameter, the high pressure air goes from a smaller room into a larger room so that the pressure is relieved. Accordingly, the temperature of the air is further lowered due to relief of the pressure so that the high pressure air can be truly cooled and the pressure of the vapor contained in the air is approximately the saturated vapor pressure.

After the high pressure air leaves the cooling tank 6, the high pressure air flows through the transfer tube 10 into the air-liquid separating tank 7. After entering the intake 71, the high pressure air is ejected from the perforations 102 to collide inner face of the wall of the air-liquid separating tank 7. The interior space of the air-liquid separating tank 7 is much larger than the diameter of the transfer tube 10 so that the pressure of the high pressure air will be further lowered to decrease the temperature to dew point of water. Accordingly, the vapor will condense to produce a great amount of liquid water.

The water drain 74 is disposed on the bottom of the air-liquid separating tank 7, while the exhaust port 72 is arranged on the top of the air-liquid separating tank 7 and the liquid water has a specific weight larger than that of the remaining gas. Therefore, the liquid water W will naturally drop onto the bottom of the air-liquid separating tank 7 and drained out from the water drain 74 and the draining valve 73. The remaining gas free from the water will get out of the air-liquid separating tank 7 from the exhaust port 72 on the top of the air-liquid separating tank 7 to be used by the pneumatic tool.

It can be known from the above that the coolant reserved in the cooling tank 6 serves to cool the high pressure air. Moreover, the cooling tube 8 has a diameter larger than that of the transfer tube 2 so that the pressure is relieved and the temperature of the high pressure air is lowered due to relief of the pressure. In addition, the flowing speed of the high pressure air is slowed down to prolong the time for which the high pressure air stays in the cooling tank. Under such multifold effects, the cooling effect of the cooling tank 6 is enhanced and the pressure of the vapor is approximately the saturated vapor pressure.

After the high pressure air is truly cooled by the cooling tank, the pressure of the vapor is approximately the saturated vapor pressure. Therefore, when the temperature is further slightly lowered to the dew point of the water (after the high pressure air enters the air-liquid separating tank 7), the vapor contained in the high pressure air is effectively condensed into liquid water.

In the air-liquid separating method of the present invention, a heat-exchange effect takes place between the coolant at normal temperature and the high pressure air at higher temperature. Moreover, the temperature is naturally decreased when the high pressure air is relieved from the pressure. When the temperature reaches dew point, the vapor naturally condenses into liquid water. Accordingly, no extra power is consumed and the cost for air-liquid separation is reduced and environmental protection is achieved.

Furthermore, the present invention employs cooling tank 6 containing the coolant C therein, air-liquid separating tank 7 and transfer tubes 2, 10 to achieve the object of air-liquid separation. The coolant can be tap water at normal temperature so that the conventional air cooled drier is unnecessary and the cost for the equipment is saved.

Also, one end 101 of the transfer tub 10 inserted in the air-liquid separating tank 7 is closed. The end 101 of the transfer tube 10 is formed with multiple radial perforations 102. Accordingly, the high pressure air is distributively ejected from the perforations 102 to collide the inner face of the wall of the air-liquid separating tank 7. Therefore, after discharged from the end 101 of the transfer tube 10, the high pressure air will not directly leave from the exhaust port 72 without being truly condensed.

Figure 2:
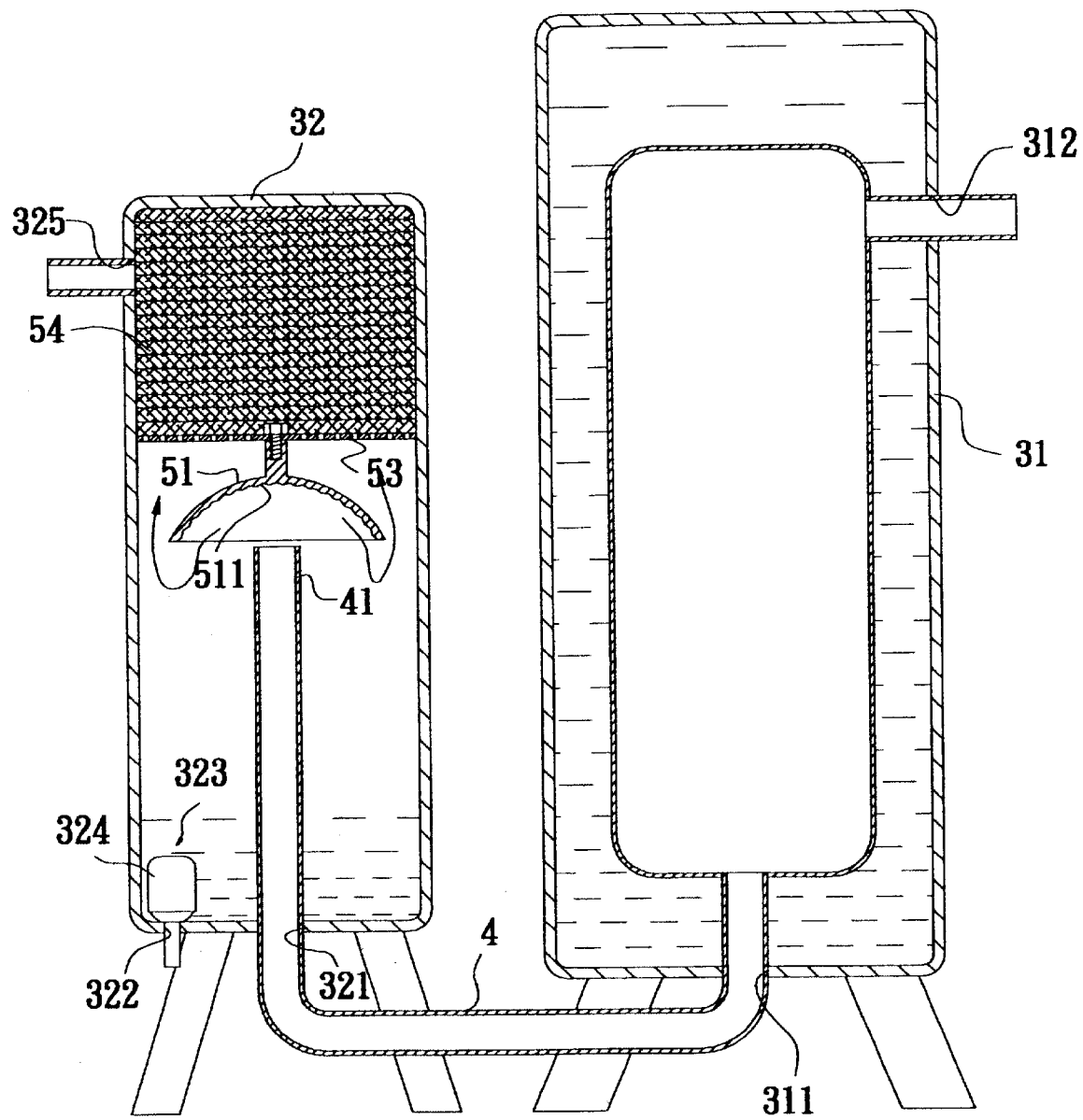
FIG. 2 is a sectional view of a second embodiment of the present invention.

FIG. 2 shows a second embodiment of the present invention, in which the cooling tank 31 and the air-liquid separating tank 32 are upright arranged side by side. The intake 321 of the air-liquid separating tank 32 is disposed on the bottom thereof. A transfer tube 4 is connected between the intake 321 and the outlet 312 of the cooling tank 31. The exhaust port 325 is disposed on upper half of the air-liquid separating tank 32.

A stop unit is disposed in the air-liquid separating tank 32 corresponding to one end 41 of the transfer tube 4 extending into the intake 321. The stop unit includes a cover 51 and a mesh 53. The cover 51 has a saw toothed concave face 511 facing the end 41 of the transfer tube. The mesh 53 is disposed on one side of the cover distal from the end 41 of the transfer tube and transversely laid on upper side of the cover. Multiple filter meshes are disposed in the air-liquid separating tank 32 on one side of the mesh 53 proximal to the exhaust port 325.

A draining valve 323 is disposed in the air-liquid separating tank 32 corresponding to the water drain 322. The draining valve 323 has a floating ball 324. When the liquid water accumulates on the bottom of the air-liquid separating tank 32 to a certain depth, the floating ball will buoy up to open the draining valve 323, permitting the liquid water to flow out from the water drain 322.

When the high pressure air flows out from the end 41 of the transfer tube, the high pressure air will collide the saw toothed concave face 511 and the vapor will condense into liquid water on the concave face 511. The liquid water flows down along the concave face 511 to accumulate on the bottom of the air-liquid separating tank 32. The remaining air free from the water ascends through the gap between the cover and the inner face of the wall of the air-liquid separating tank 32 and passes through the mesh and leaves from the exhaust port 325.

The high pressure air output from the air compressor contains a great amount of oily fog so that the filter meshes 54 disposed near the exhaust port 325 serve to filter off the oily fog from the air free from water.

Figure 3:
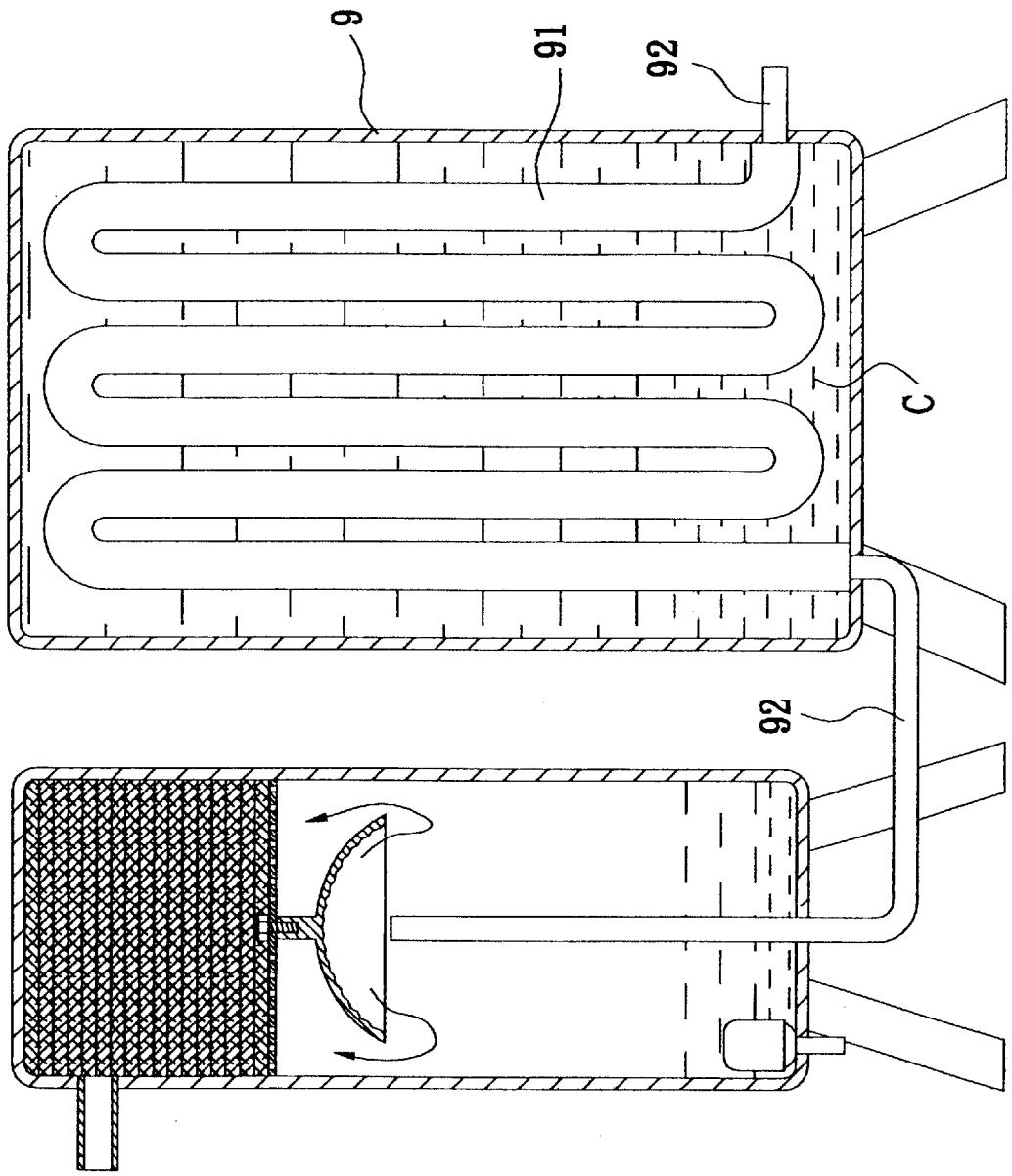
FIG. 3 is a sectional view of a third embodiment of the present invention.

FIG. 3 shows a third embodiment of the present invention, which is different from the second embodiment in that the cooling tube 91 in the cooling tank 9 winds and extends to prolong the time for which the high pressure air stays in the cooling tank 9 and enhance cooling effect. The diameter of the cooling tube 91 is larger than that of the transfer tube 92 and the coolant C is contained in the cooling tank 9.

The above embodiments are only used to illustrate the present invention, not intended to limit the scope thereof. Many modifications of the above embodiments can be made without departing from the spirit of the present invention.

What is claimed is:

1. An air-liquid separating method for compressed air, comprising steps of:

transferring high pressure air through a transfer tube and passing the high pressure air through a cooling tube of at least one cooling tank for cooling, a coolant being reserved in the cooling tank, the cooling tube having a diameter larger than the diameter of the transfer tube, whereby the high pressure air goes from a smaller room into a larger room so that the pressure is relieved and the temperature of the air is lowered due to relief of the pressure; and transferring the high pressure air passing through the cooling tank into an air-liquid separating tank to approximately lower the temperature of the high pressure air to dew point, whereby the vapor is condensed into liquid water which drops onto a bottom of the air-liquid separating tank to remove water from the high pressure air.

2. The air-liquid separating method for compressed air as claimed in claim 1, wherein the coolant is water at normal temperature.

3. An air-liquid separating apparatus for compressed air, comprising:

at least one cooling tank containing a coolant therein, the cooling tank having an inlet and an outlet, the inlet being connected with a transfer tube for transferring high pressure air, a cooling tube being disposed in the cooling tank, the cooling tube having a diameter larger than the diameter of the transfer tube, two ends of the cooling tube being respectively connected with the inlet and outlet, whereby when the high pressure air passes through the cooling tube, the high pressure air is cooled and the pressure of the vapor contained in the air is approximately the saturated vapor pressure; and an air-liquid separating tank having an intake, an exhaust port positioned in a position higher than the intake and a draining valve disposed on the bottom of the air-liquid separating tank for draining liquid water, another transfer tube being connected between the intake and the outlet of the cooling tank, whereby after the high pressure air passes through the cooling tank and flows through the transfer tube and the intake into the air-liquid separating tank, due to relief of the pressure, the temperature of the high pressure air will be approximately lowered to dew point of water, whereby the vapor contained in the high pressure air is condensed into liquid water which accumulates on the bottom of the air-liquid separating tank, while the remaining air free from water is output from the exhaust port.

4. The air-liquid separating apparatus for compressed air as claimed in claim 3, wherein one end of the other transfer tube inserted in the intake of the air-liquid separating tank is closed, a wall of the transfer tube near the end being formed with multiple radial perforations.

5. The air-liquid separating apparatus for compressed air as claimed in claim 3, wherein the cooling tank and the air-liquid separating tank are both transversely arranged and the inlet and outlet are respectively disposed at two ends of the cooling tank, the cooling tank being closed except the inlet and outlet, the cooling tank having a water gate for filling coolant into the cooling tank, the air-liquid separating tank being laid on upper side of the cooling tank.

6. The air-liquid separating apparatus for compressed air as claimed in claim 3, wherein the cooling tank and the air-liquid separating tank are upright arranged side by side, the intake of the air-liquid separating tank being disposed on the bottom thereof, the exhaust port being disposed on upper half of the air-liquid separating tank.

7. The air-liquid separating apparatus for compressed air as claimed in claim 3, wherein a stop unit is disposed in the air-liquid separating tank corresponding to one end of the other transfer tube extending into the intake, the stop unit including a cover and a mesh, the cover having a concave face facing the end of the transfer tube, the mesh being disposed on one side of the cover distal from the end of the transfer tube, whereby when the high pressure air flows out from the end of the other transfer tube, the high pressure air will collide the concave face and the vapor will condense into liquid water on the concave face, the liquid water flowing down along the concave face to accumulate on the bottom of the air-liquid separating tank, the remaining air free from the water passing through the mesh and leaving from the exhaust port.

8. The air-liquid separating apparatus for compressed air as claimed in claim 3, wherein the draining valve has a floating ball, whereby when the liquid water accumulates on the bottom of the air-liquid separating tank to a certain depth, the floating ball buoys up to open the draining valve for draining the water.

9. The air-liquid separating apparatus for compressed air as claimed in claim 3, wherein at least one filter mesh is disposed in the air-liquid separating tank on one side of the mesh proximal to the exhaust port, the filter mesh serving to filter off oily fog from the high pressure air.

10. The air-liquid separating apparatus for compressed air as claimed in claim 3, wherein the cooling tube winds and extends.

* * * * *